Figure 1:
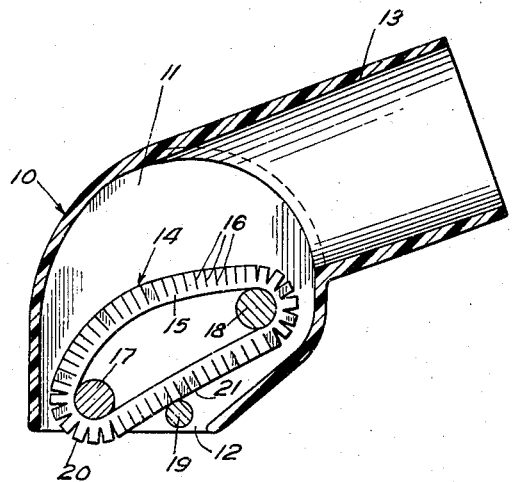

Sept. 9, 1958  J. E. DUFF ET AL  2,850,758
LITTER LIFTING CLEANING TOOL

Filed April 6, 1955  2 Sheets-Sheet 1

United States Patent Office 2,850,758
Patented Sept. 9, 1958

2,850,758

LITTER LIFTING CLEANING TOOL

Jack E. Duff, Canton, and Melvin H. Ripple, North Canton, Ohio, assignors to The Hoover Company, North Canton, Ohio, a corporation of Ohio Application April 6, 1955, Serial No. 499,614

2 Claims. (Cl. 15—369)

The instant invention relates to cleaning tools and more particularly to a litter lifter which is adapted for use in such tools for removing litter and like substances from a surface to be cleaned.

The removal of litter and like substances from surfaces being cleaned by suction cleaning tools has been an ever present problem for which many solutions have been proposed. None of these, however, have been fully satisfactory in completely removing the litter from the surfaces being cleaned. Predominant among the substances classified as litter are hair, lint, and the like, which have a tendency to adhere to the nap of carpets and upholstery, making the removal thereof by suction means alone an inefficient cleaning operation. Various forms of litter pickers, brushes and the like have been utilized for removing the litter from the nap of carpets and upholstery. The latter are intended to brush or comb the carpets and upholstery to thereby strip the litter from the same and to place it in the path of a suction flow of air, which is adapted to remove the litter to a suction producing and filtering device. However, it is found that the litter pickers and brushes have a tendency to become clogged with the litter stripped from the surfaces being cleaned so that they in turn must be cleaned of litter, usually by hand.

It is the purpose of the instant invention to provide a novel cleaning tool for removing litter and the like from surfaces being cleaned. In accordance with the instant invention, there is provided a litter lifter which is adapted to be disposed in contiguity to a surface being cleaned for receiving litter and the like from that surface and lifting the same therefrom. The litter lifter removes the litter and the like to a point remote from the surface, where it is discharged to a suction stream of air which carries the litter and the like to a suction producing and filtering device which may be of a conventional form.

More specifically, the instant invention provides a litter lifter which is in the form of an endless belt with a plurality of radial slits in the surface thereof extending around the run of the belt. The belt is supported for movement in a generally elliptical path, and the slits in the portions of the belt disposed at the opposite ends of the major axis of the elliptical path are opened. One of said portions of the belt with the open slits is disposed in contiguity to the surface being cleaned and traversed over that surface. The litter which is deposited on the surface falls within the open slits, and as the belt is traversed over the surface, the slits therein are moved through the elliptical path. The slits which are opened have the litter received therewithin, and as the slits are moved away from their original position adjacent the surface, they are closed to grip the litter, whereby it is removed from the surface being cleaned. The movement of the belt is continuous to move said litter containing slits to a point remote from the surface at the other end of the major axis of the elliptical path, where the slits are reopened in the presence of a suction flow of air which removes the litter and the like from said slits for depositing the same in a filtering device of a known form. By virtue of the formation of the novel litter lifter of this invention comprising the endless belt with the slits formed in the surface thereof, there is a continuous process of successively opening the slits in the presence of the litter to receive the same, closing the slits to grip the litter therewithin and reopening the slits at a point remote from the surface for discharging the litter therefrom.

Thus, it is a prime object of the instant invention to provide a novel cleaning tool which is particularly adapted to remove litter from a surface to be cleaned.

It is another object of the instant invention to provide a novel cleaning tool comprising a litter lifting element which is adapted to receive litter from a surface to be cleaned, grip the litter for removing it from that surface, and discharge the litter at a point remote from the surface.

It is a further object of the instant invention to provide a novel suction cleaning tool utilizing a litter lifting element which is adapted to receive litter from a surface to be cleaned, grip the litter to remove it from that surface and to discharge the litter at a point remote from the surface in the presence of a suction flow of air for removal of the litter to a suction producing and filtering device.

Still another object of the instant invention is to provide a novel cleaning tool, including a litter lifter which is formed with a plurality of slits which are adapted to be opened adjacent a surface to be cleaned for the reception of litter within said slits and including means for closing the slits gripping the litter therewithin and removing it from the surface, and reopening the slits at a point remote from the surface for discharge of the litter therefrom.

Figure 3:
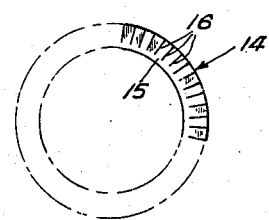
Figure 2:
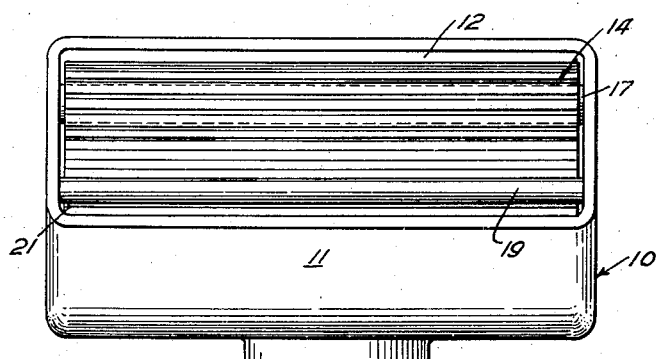
Figure 4:
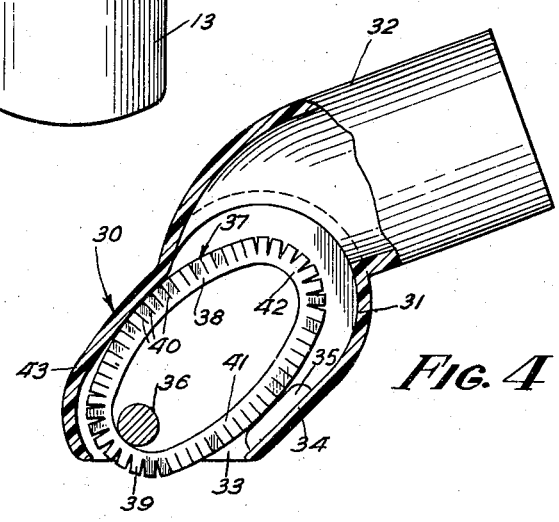
Figure 5:
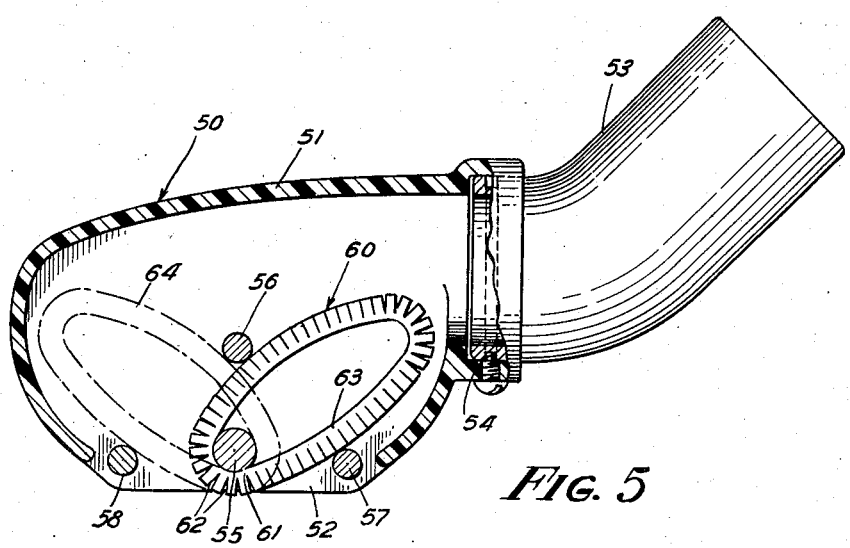
Figure 6:
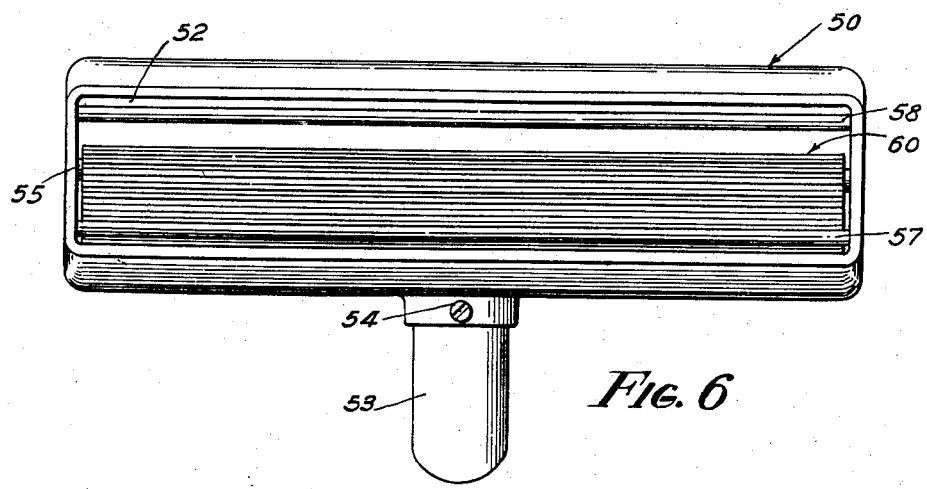

Further objects and advantages of the instant invention will be apparent to those skilled in the art upon consideration of the detailed description of several preferred embodiments of the invention which follows, reference being had to the drawings in which:

Figure 1 is a sectional view of a cleaning tool formed in accordance with the instant invention, Figure 2 is a bottom plan view of the cleaning tool of Figure 1, Figure 3 is a view of the novel litter lifter removed from the cleaning tool of Figure 1, Figure 4 is a sectional view of a modified form of cleaning tool utilizing the litter lifter of the instant invention, Figure 5 is a sectional view of still another form of cleaning tool utilizing the litter lifter of this invention, and Figure 6 is a bottom plan view of the cleaning tool illustrated in Figure 5.

Referring to Figs. 1 and 2, there is illustrated a suction cleaning tool 10 comprising a nozzle 11 formed with a mouth 12 and an air discharge conduit 13. The suction cleaning tool 10 is adapted to be connected to a suction producing and filtering machine of a conventional form known to the art by means of a flexible hose, or the like, and a rigid suction tube, one end of which is mated with the end of the air discharge conduit 13. Any suitable means may be provided in the air discharge conduit 13 for securing it to the end of the suction tube to form an airtight junction between the cleaning tool and the tube. The suction tube is used as a manipulating handle for the cleaning tool in the manner known to the art.

The nozzle body 11 forms a chamber within which there is disposed the novel litter lifter 14 of the instant invention. The litter lifter 14 comprises an endless belt 15 made of flexible, substantially unyielding material. Plastic materials have been found to be particularly suitable for the formation of the litter lifter 14, although it is contemplated that other materials may be used to equal advantage in practicing the invention. The outer surface of the endless belt 15 is formed with a plurality of slits 16 which are cut into the belt 15 to a depth equaling approximately two thirds the thickness of the belt. This ratio of the depth of the slits 16 to the thickness of the belt 15 has been found to be best suited to the purposes of the invention, although it will be apparent as the description of the invention proceeds, that the depth of the slits 16 is not critical and may vary somewhat from the above cited specification.

The endless belt 15 is disposed within the nozzle 11 and maintained therein in a substantially elliptical configuration having the major axis thereof disposed at an angle to the plane of the mouth, with the belt 15 extending upwardly and rearwardly within the nozzle 11. The belt 15 is supported within the nozzle 11 by a forwardly disposed backing roller 17 and a rearwardly disposed supporting roller 18, on which the belt 15 is entrained. The nozzle 11 additionally includes a wiping roller 19 bearing against the intermediate run 21 of the belt 15.

The litter lifter 14 is preferably formed from a cylinder of plastic material, or the like, which is flexible and substantially unyielding. The cylinder of material, which normally has a circular cross-section as illustrated in Fig. 3, may be mounted on a mandrel, or the like, and slits 16 cut into the surface thereof to a proper depth. The slits 16 are preferably cut on lines parallel to the axis of the cylinder comprising the belt 15, although other patterns, such as a helix, may also be used to advantage. In the preferred forms of the invention, the slits 16 are formed in the belt 15 by a knife so that there is no material removed from the belt in the process of cutting it. Thus, in the free form of the litter lifter 14, as illustrated in Fig. 3, the opposite faces of the slits 16 will abut each other, and the slits will be closed. However, when the belt 15 is elongated in a direction parallel to a diameter thereof, wherein the belt 15 assumes a substantially elliptical cross-section, opposite portions of the belt which are disposed at the opposite ends of the major axis of the ellipse will have the slits therein opened, while the slits in the portions of the belt intermediate the opposite ends of the major axis will remain closed. Due to the distortion of the belt 15, the slits in said intermediate portions of the belt will be closed and compressed somewhat so that any substance caught within the slits between the opposite faces thereof will in effect be gripped by the slit.

Although the slits 16 are described herein as being cut into the surface of the belt 15 by a knife without removing any material, the belt 15 may also be cut with a saw to form very narrow slots, in which case some material will be removed from the belt. In the belt formed with these narrow slots, the operation of the litter lifter will be the same as that described herein with respect to the slitted belt 15. When the slitted belt is elongated in a direction parallel to a diameter thereof to assume a generally elliptical configuration, the portions of the belt disposed at the opposite ends of the major axis of that configuration will have the slots therein spread open, while the slots in the portions of the belt intermediate the first said portions will be closed due to the flattening of the belt in the intermediate portions. The slots in the intermediate belt portions will be closed in compression with the opposite faces of the slots abutting each other to grip litter and the like within the slots. It will thus be understood that the belt formed with the slits, and the belt formed with the slots are equivalent constructions operating in the same manner in accordance with the stated objects of the invention.

Referring again to Fig. 1, the belt 15 of the litter lifter 14 is seen to be mounted in the nozzle 11 on the rollers 17, 18 with the belt 15 supported therebetween with a substantially elliptical cross-section in which the opposite end portions of the belt adjacent the opposite ends of the major axis of the elliptical cross-section of the belt have the slits therein opened. The forwardly disposed roller 17 is so positioned as to locate the leading portion 20 of the belt 15 slightly beyond the plane of the nozzle mouth 12 so as to come into contact with a surface which is to be cleaned. As the cleaning tool 10 is traversed forwardly over the surface to be cleaned, the belt 15 will move in a counterclockwise direction about the supporting rollers 17, 18 in a substantially elliptical path coincident with the configuration of the belt 15.

In the operation of the novel cleaning tool, a source of suction is connected to the air discharge conduit 13, and the nozzle mouth 12 is applied to a surface to be cleaned. The tool 11 is traversed over the surface in a forwardly direction, whereby the belt 15 of the litter lifter 14 will frictionally engage the surface and be moved thereby about the rollers 17, 18. Litter and like substances disposed on the surface being cleaned will fall into the open slits in the leading portion 20 of the belt 15. As above described, the slits 16 in the leading portion 20 of the belt 15 are open. However, as the belt is moved about in its elliptical path, the slits will be closed as they move to the vicinity of the wiping roller 19. Upon closure of the slits, the litter disposed therewithin will be gripped between the opposite faces of the slits 15. The gripping action occurring when the slits are closed is augmented by the fact that the intermediate run 21 of the belt is compressed somewhat so that the slits are closed with a certain amount of pressure being applied to the opposite faces thereof in contrast to the condition of the slits when the belt is in its normal state as illustrated in Fig. 3. The litter gripped between the opposite faces of the slits 16 will be removed from the surface being cleaned as the slits continue their travel in a counterclockwise direction in the generally elliptical path. The rotating wiping roller 19 bears on the surface of the belt 15 in the intermediate run 21, smoothing the litter against the surface of the belt 15, preventing the litter being torn or shreaded and insuring that the litter will be lifted in whole from the surface being cleaned.

As the belt 15 continues its counterclockwise travel around the rollers 17, 18, the slits with the litter gripped therewithin will be passed about the periphery of the roller 18, at which point the slits will be reopened in the same manner in which they were originally opened. The roller 18 is disposed adjacent the air discharge conduit 13 so that the slits 16 are reopened in the vicinity of the suction flow of air. Thus, the reopened slits release the grip on the litter contained therewithin, and the suction flow of air is effective to remove the litter from the slits and to discharge the same to the suction creating and filtering device.

Figs. 1 and 2 show the litter lifter 14 of the instant invention as embodied in a cleaning tool which is relatively short and is particularly suited for cleaning operations on upholstery and the like. However, it will be understood that the size and particular configuration of the nozzle body are not critical in the embodiment of the invention illustrated in Figs. 1 and 2 and may be varied to adapt the cleaning tool 10 for any desired cleaning operations. It will also be apparent to those skilled in the art that the suction flow of air enters through the nozzle mouth 12 of the cleaning tool, and that the portions of the nozzle 11 defining the mouth 12 may be configured in any manner found to be satisfactory to effect a steady flow of air through the nozzle 11. In addition to removing the litter from the litter lifter 14, this flow of air will also lift dust and the like from the surface being cleaned in the manner known to the art.

A modified form of the instant invention is illustrated in Fig. 4. In this embodiment of the invention, the cleaning tool 30 is formed with a nozzle body 31 of a generally elliptical cross-section having an air discharge conduit 32 leading from the nozzle 31, which is adapted to be connected in the usual manner to a suction creating and filtering device of a known form. The nozzle body 31 includes a nozzle mouth 33 defined by a peripheral lip at the bottom of the nozzle body 31. The rear wall 34 of the nozzle body 31 includes a plurality of spaced elongated shoulders 35 disposed along the width of the rear wall 34. A rotating backing roller 36 is disposed in the vicinity of the nozzle mouth 33 spaced slightly above and towards the front thereof. The litter lifter 37 comprising the belt 38 is entrained about the roller 36 within the nozzle body 31, with the opposite walls 34, 43 of the latter confining the belt 38 in a substantially elliptical configuration.

In operation of the cleaning tool 30, the nozzle mouth 33 is placed in contiguity to a surface to be cleaned with the leading portion 39 of the litter lifter 37 bearing against that surface. The backing roller 36 supports the belt 38 in contact with the surface to be cleaned. By virtue of the elliptical configuration of the belt 38, the slits 40 which are in the leading portion 39 of the belt 38 are spread open so that litter from the surface being cleaned may be received therewithin. As the cleaning tool 30 is traversed over the surface being cleaned in a forwardly direction, the belt 38 will be moved in a counterclockwise direction within the nozzle body 31 in an elliptical path coincident with its configuration. Thus, the slits 40 in the leading belt portion 39, with the litter disposed between the opposite faces thereof, will be removed successively from the surface being cleaned, and the slits 40 closed as they move into the intermediate run 41 of the belt 38. In the intermediate run 41 of the belt 38, the slits 40 are closed in compression with the litter trapped therein and gripped between the opposite faces of the slits 40. As the belt 38 continues its travel, the slits containing the litter will be removed to a remote position 42 at the opposite end of the major axis of the elliptical configuration in which the belt 38 is maintained, and the slits 40 reopened in the vicinity of the air discharge conduit 33, at which point the suction flow of air is effective to remove the litter from the slits 40 and discharge the same to a suction producing and filtering device of a conventional form known to the art.

The intermediate run 41 of the belt 38 bears against the shoulders 35. These shoulders 35 are spaced such distance apart along the width of the rear wall 34 of the nozzle body 31 as to leave passages between the rear wall 34, and the belt 38 to provide a continuous and steady flow of air into the nozzle 31. In the absence of the shoulders 35, the intermediate run 41 of the belt 38 would abut the rear wall 34 of the nozzle, thereby sealing the same and preventing the suction flow of air which operates to remove the litter from the slits 40 of the litter lifter 37.

In each of the embodiments heretofore described, the cleaning tool embodying the litter lifter of this invention is adapted to be unidirectional in its operation. Operation of these cleaning tools in a forward direction is effective to lift the litter away from the surface being cleaned and to remove it from that surface. While the cleaning tool is traversed with respect to the surface being cleaned, the litter lifter element bears against that surface and engages the same so that there is no relative movement between the litter lifter and the surface, but rather the litter lifter moves relatively to the nozzle obdy. Thus, operating the litter lifter in a forwardly direction, the slits are opened and closed closely adjacent to the surface being cleaned, whereas the same would not be true if the litter lifter were operated in a rearwardly direction. That is to say, in the latter condition the slits in the litter lifter would be closed at a point somewhat removed from the surface being cleaned so that the litter would not be effectively gripped by the slits, if it is gripped at all. In order to insure proper operation of the litter lifter, it is mounted within the cleaning tool in the configuration of an ellipse, the major axis of which lies at a rearwardly extending angle to the surface being cleaned, so that the slits will not be very far removed from the surface when they are closed with the litter gripped between the opposite faces thereof. Thus, the slits will always be closed while the litter is disposed between the opposite faces thereof, so that the litter will be gripped and properly stripped from the surface being cleaned.

A further embodiment of the instant invention is illustrated in Fig. 5. In this embodiment, the cleaning tool embodying the novel litter lifter of this invention may be operated in opposite directions to remove litter with equal effectiveness in both the forward and rearward strokes of the cleaning tool.

Referring to Fig. 5, the cleaning tool 50 comprises a nozzle body 51 having a nozzle mouth 52 and a rearwardly disposed air discharge conduit 53. A swivel connection 54 connects the air discharge conduit 53 to the nozzle body 51 for facilitating operation of the latter. The end of the air discharge conduit 53 may include any suitable latching means for securing one end of a suction tube thereto for use of the latter as a manipulating wand in the manner known to the art, the other end of the suction tube being connected to a suitable suction creating and filtering device.

A backing roller 55 is centrally disposed in the nozzle mouth 52, and a guiding roller 56 is mounted in the nozzle body 51 above and in alignment with the backing roller 55. Wiping rollers 57, 58 are mounted in the nozzle body 51 at corresponding positions to the rear and front, respectively, of the supporting roller 55 in the region of the nozzle mouth 52.

The litter lifter 60 is entrained about the supporting roller 55 and confined between the guiding roller 56 and the wiping roller 57 in a substantially elliptical configuration for movement of the slits 62 in a path coincident with the cross-sectional configuration of the litter lifter 60. The backing roller 55 is so located in the nozzle mouth 52 as to dispose the entrained portion 61 of the litter lifter 60 slightly below the mouth 52, so that the slits 62 will pass into contact with the surface for the reception of litter therefrom.

In the operation of the cleaning tool 50, it is traversed over a surface to be cleaned with the portion 61 of the litter lifter 60 in contact with the surface, whereby the litter disposed on the surface will be received within the slits 62. As the cleaning tool 50 is moved in a forwardly direction over the surface, the frictional engagement of the litter lifter 60 with that surface will cause it to move in a counterclockwise direction in the elliptical path, moving the slits 62 away from the surface with the litter contained therein and closing the slits 62 as they are removed from the surface. As the slits 62 move through the intermediate flight 63 of the litter lifter 60, the wiping roller 57 engages the surface of the litter lifter 60 to smooth the trapped litter against the surface of the litter lifter 60 to prevent the litter from tearing or shredding. As the movement of the litter lifter 60 is continued in the counterclockwise direction, the slits 62 are moved to the end of the elliptical path opposite the backing roller 55, where the slits are reopened in the presence of the suction flow of air in the air discharge conduit. The litter is removed from the reopened slits by the suction flow of air and carried to the filtering and suction producing device which is connected to the air discharge conduit 53.

Upon rearward movement of the cleaning tool 50 with the litter lifter 60 engaged with the surface to be cleaned, the litter lifter 60 will tend to pull out from between the guide roller 56 and the wiping roller 57. In effect the frictional engagement between the litter lifter 60 and the surface being cleaned will be sufficient to cause the litter lifter 60 to drag when the cleaning tool 50 is moved rearwardly. The result of these movements will be for the litter lifter 60 to move to the left as viewed in Fig. 5 with respect to the nozzle body 50 and assume a disposition as shown by the broken lines 64. Thus, the litter lifter 60 will assume a disposition between the guide roller 56 and the wiping roller 58, and upon continued rearward movement of the cleaning tool 50, it will operate to pick up litter from the surface being cleaned in the same manner as previously, although the litter lifter will operate in the opposite direction. Thus, the novel cleaning tool as constructed according to the instant embodiment of the invention may be operated with both forward and rearward strokes.

While the instant invention has been described herein as embodied in several preferred forms, it is to be understood that the latter are merely exemplary and are subject to modifications within the spirit of the invention. Accordingly, it is not intended that the scope of the invention be limited except as set forth in the claims which follow.

We claim:

1. A cleaning tool comprising, a suction nozzle formed with a mouth and with a suction passage leading upwardly therefrom to be applied to a surface to be cleaned, and a litter lifter in the form of a flexible element movably mounted in said suction nozzle so that one face thereof comes into contact with said surface at said suction mouth and at one point in the travel of said element and moves out of contact with said surface and into said suction passage at another point in the travel of said element, a plurality of slits formed in said one face of said flexible element, said slits being opened to receive litter as said one face moves into contact with said surface and being reclosed to grasp litter as said one face moves out of contact with said surface and into said suction passage, means mounting said flexible element within said nozzle so that said slits are reopened within said suction passage, including a backing roller positioned in said suction passage and over which said flexible element passes so as to open said slits as said element contacts the surface being cleaned, said backing roller cooperating to hold said element within said suction passage in an elliptical form whereby said slits will reopen at a point within the suction air stream, and a plurality of additional rollers extending lengthwise of said nozzle and cooperating with said backing roller to hold said flexible element in two alternative elliptical positions, one of said alternative positions extending upwardly and rearwardly from said backing roller and effective upon forward movement of said nozzle and the other extending upwardly and forwardly of said backing roller and effective upon rearward movement of said nozzle.

2. A cleaning tool according to claim 1 in which there are three of said additional rollers, one positioned above said backing roller, one positioned rearwardly thereof and one positioned forwardly thereof, and in which the slitted face of said element is positioned for contact with the surface being cleaned so as to frictionally engage the surface and drive said element in its elliptical path, the arrangement being such that upon forward movement of said nozzle said element is positioned between the upper and rearwardly positioned additional rollers in said one alternative position, upon rearward movement of said nozzle said element is positioned between the upper and forwardly positioned additional rollers in said other alternative position and upon a reversal of the direction of movement of said nozzle said element moves from one of its alternative positions to the other.

References Cited in the file of this patent

UNITED STATES PATENTS

| | | |
|---|---|---|
| 1,334,822 | Varble | Mar. 23, 1920 |
| 1,480,285 | Moore | Jan. 8, 1924 |
| 1,507,243 | Meyer | Sept. 2, 1924 |
| 1,689,497 | Morgal | Oct. 30, 1928 |
| 2,086,070 | Dunn | July 6, 1937 |
| 2,624,064 | Snyder | Jan. 6, 1953 |
| 2,670,584 | Rood et al. | Mar. 2, 1954 |
| 2,711,816 | Reno | June 28, 1955 |

FOREIGN PATENTS

| | | |
|---|---|---|
| 271,044 | Sweden | Jan. 3, 1951 |
| 1,094,914 | France | Dec. 15, 1954 |